(12) United States Patent  (10) Patent No.: US 8,355,689 B2
Probst et al.                 (45) Date of Patent:    Jan. 15, 2013

(54) INDEPENDENT FIELD DEVICE FOR AUTOMATION PURPOSES WITH INTRINSIC SAFETY BARRIER

(75) Inventors: Stefan Probst, Weil am Rhein (DE); Marc Fiedler, Reinach (CH)

(73) Assignee: Endress + Hauser Process Solutions AG, Reinach (CH)

( * ) Notice: Subject to any disclaimer, the term of this patent is extended or adjusted under 35 U.S.C. 154(b) by 246 days.

(21) Appl. No.: 12/451,978

(22) PCT Filed: Aug. 3, 2009

(86) PCT No.: PCT/EP2009/060030
§ 371 (c)(1),
(2), (4) Date: Jun. 1, 2010

(87) PCT Pub. No.: WO2010/015600
PCT Pub. Date: Feb. 11, 2010

(65) Prior Publication Data
US 2010/0244806 A1  Sep. 30, 2010

(30) Foreign Application Priority Data
Aug. 6, 2008 (DE) .......................... 10 2008 036 554

(51) Int. Cl.
H05F 3/04  (2006.01)
(52) U.S. Cl. ...................... 455/343.1; 455/340; 700/292
(58) Field of Classification Search .................. 455/340, 455/343.1; 700/792
See application file for complete search history.

(56) References Cited

U.S. PATENT DOCUMENTS

| 5,424,709 | A | 6/1995 | Tal |
| 5,703,468 | A * | 12/1997 | Petrillo .......................... 320/101 |
| 2004/0075566 | A1 | 4/2004 | Stepanik |
| 2005/0065618 | A1 | 3/2005 | Burkatovsky |
| 2005/0116021 | A1* | 6/2005 | O'Dougherty et al. ....... 235/375 |
| 2006/0092039 | A1 | 5/2006 | Saito et al. |
| 2006/0142875 | A1 | 6/2006 | Keyes |

(Continued)

FOREIGN PATENT DOCUMENTS
DE  01817638 A1  6/1970
(Continued)

OTHER PUBLICATIONS

Lindner, H., u.a.: Elektrotechnik-Electronik, Formeln und Gesetze. Buch- und Zeit-Verlagsges.mbH, 1982, pp. 239, 240.

*Primary Examiner* — Edward Urban
*Assistant Examiner* — Stacey Sorawat
(74) *Attorney, Agent, or Firm* — Bacon & Thomas, PLLC

(57) ABSTRACT

The invention relates to an autarkic field device or an autarkic radio adapter (2) for a field device (1), of automation technology fed with limited energy via an energy supply unit (3) associated, or associable, with the field device (1) or the radio adapter (2), characterized in that, between the energy supply unit (3) and an internal voltage source (4), whose voltage exceeds, or at times can exceed, the voltage of the energy supply unit (3), a barrier (5a; 5b) of at least one diode group having at least two diodes (6) connected in parallel is arranged, which blocks flow of electrical current from the internal voltage source (4) to the energy supply unit (3) or to the connection terminals (7) of the field device (1) or of the radio adapter (2) for the energy supply unit (3).

8 Claims, 3 Drawing Sheets

U.S. PATENT DOCUMENTS

Figure 1:
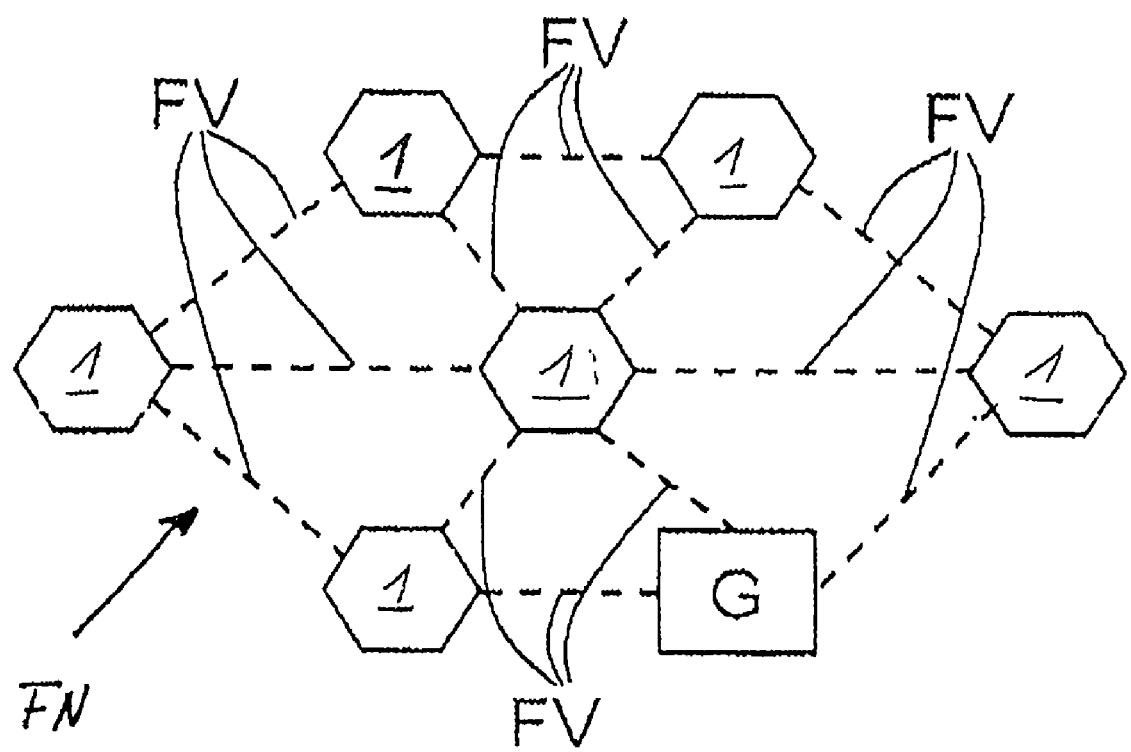

| | | | |
|---|---|---|---|
| 2007/0285224 A1* | 12/2007 | Karschnia et al. | 340/538 |
| 2008/0125175 A1* | 5/2008 | Guenter et al. | 455/557 |
| 2008/0180226 A1 | 7/2008 | Schmidt | |
| 2009/0253388 A1* | 10/2009 | Kielb et al. | 455/117 |

FOREIGN PATENT DOCUMENTS

| | | |
|---|---|---|
| DE | 2 238 850 | 3/1973 |
| DE | 9208945 * | 12/1992 |
| DE | G 92 08 945.3 | 12/1992 |
| DE | 101 13 676 | 9/2002 |
| DE | 10 2005 046 707 B3 | 5/2007 |
| DE | 10 2006 055 900 | 6/2007 |
| WO | WO 2005/086110 | 9/2005 |
| WO | WO 2005/103851 | 11/2005 |

\* cited by examiner

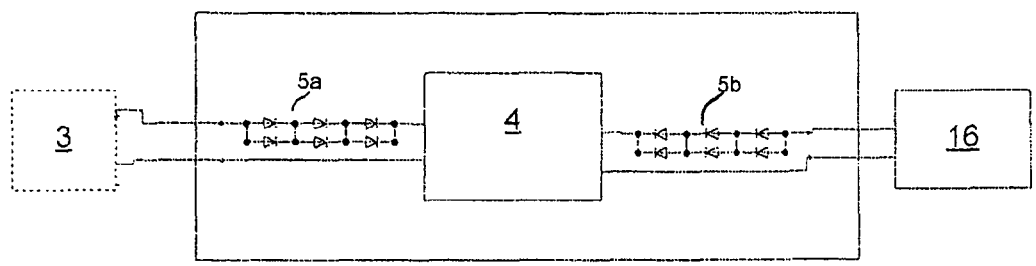
Fig. 3
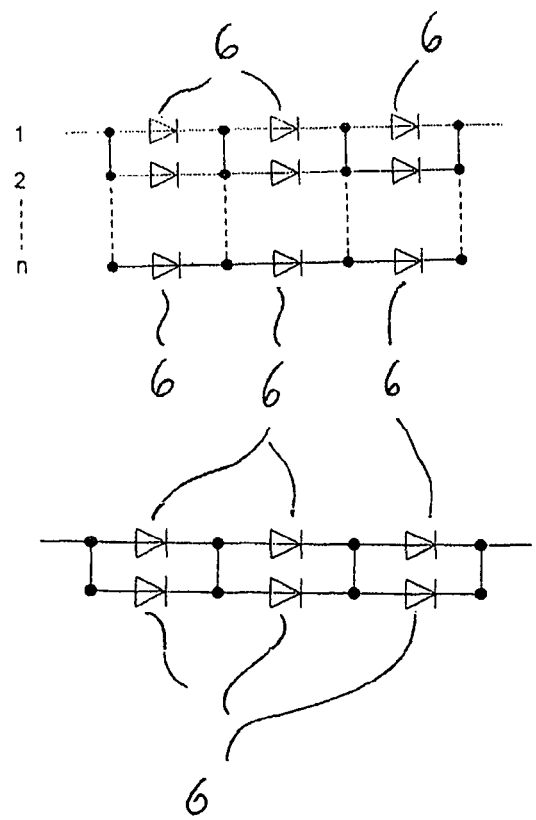
Fig. 4
Fig. 5

INDEPENDENT FIELD DEVICE FOR AUTOMATION PURPOSES WITH INTRINSIC SAFETY BARRIER

FIELD DEVICE OF AUTOMATION TECHNOLOGY

The invention relates to an autarkic field device or an autarkic radio adapter for a field device of automation technology, which is fed with limited energy via an energy supply unit associated, or associable, with the field device or radio adapter.

In process automation technology, field devices are often applied, which serve to register and/or influence process variables. To register process variables, sensors serve as, for example, fill level measuring devices, flow measuring devices, pressure and temperature measuring devices, pH-redox potential measuring devices, conductivity measuring devices, etc., which register the corresponding process variables, fill level, flow, pressure, temperature, pH-value, or conductivity. Serving to influence process variables are actuators, such as, for example, valves or pumps, via which the flow of a liquid in a pipeline section, or the fill level in a container can be changed. In principle, all devices, which are applied near to the process and which deliver or process the process relevant information, are referred to as field devices. Besides sensors and actuators, generally also referred to as field devices are any units, which are directly connected to a fieldbus and which serve for communication with superordinated units, e.g. as remote I/Os, gateways, linking devices, and wireless adapters. A multiplicity of such field devices are produced and sold by the Endress+Hauser group.

In modern industrial plants, field devices are, as a rule, connected with superordinated units via bus systems (Profibus®, Foundation® Fieldbus, HART®, etc.). Normally, superordinated units involve control systems or control units, such as, for example, a PLC (programmable logic controller). The superordinated units serve, among other things, for process control, process visualization, process monitoring as well as start-up of the field devices. The measured values registered by the field devices, especially sensors, are transmitted via the connected bus system to one or, in given cases, also to a number of superordinated units. Along with that, a data transmission from the superordinated unit via the bus system to the field devices is also required; such data transmission serves especially for configuring and parametering field devices or for diagnostic purposes. Generally stated, the field device is serviced from the superordinated unit via the bus system.

Besides hardwired data transmission between the field devices and the superordinated unit, the possibility of wireless data transmission also exists. Especially in the bus systems Profibus®, Foundation® Fieldbus and HART®, wireless data transmission via radio is provided for by specification. Additionally, radio networks for sensors are specified in the standard IEEE 802.15.4 in greater detail. For implementing wireless data transmission, newer field devices, especially sensors and actuators, are, in part, embodied as radio field devices. These have, as a rule, a radio unit and an electrical current source as integral components. In such case, the radio unit and the electrical current source can be provided in the field device itself or in a radio module durably connected to the field device. Through the electrical current source, an autarkic energy supply is enabled in the field device.

Besides this, there is the opportunity to turn field devices without radio units into radio field devices, by coupling with a wireless adapter, which has a radio unit. A corresponding wireless adapter is described, for example, in the publication WO 2005/103851 A1. The wireless adapter, as a rule, is releasably connected to a fieldbus communication interface of the field device. Via the fieldbus communication interface, the field device can transmit the data to be transferred via the bus system to the wireless adapter, which then transmits these via radio to the target location. Conversely, the wireless adapter can receive data via radio and forward it via the fieldbus communication interface on the field device. Supplying the field device with electrical power occurs then, as a rule, via an energy supply unit of the wireless adapter.

In the case of autarkic radio field devices and wireless adapters, the communication, for example with a superordinated unit, is conducted as a rule via the wireless interface of the radio field device or the wireless adapter. Additionally, such radio field devices or wireless adapters have, as a rule, a hardwired communication interface. For example, in the HART® standard, it is provided that radio field devices must also have a hardwired communication interface, in addition to a wireless interface. Via such a hardwired communication interface, for example, on-site configuration of the radio field device or the wireless adapter is possible via a service unit, such as, for example, a handheld communicator connected to the hardwired communication interface. Additionally, the hardwired communication interface can be embodied as a fieldbus communication interface, so that the communication is conducted there across according to a bus system, such as, for example, according to one of the standardized bus systems, Profibus®, Foundation® Fieldbus or HART®. Via such a fieldbus communication interface, the radio field device or the wireless adapter can also be connected to a corresponding hardwired fieldbus.

The energy supply unit or the electrical current source of a wireless adapter or a radio field device is, for example, a disposable battery provided in the wireless adapter or the radio field device, a fuel cell, a solar energy supply, and/or a rechargeable battery.

If field devices or radio adapters are fed from an energy supply unit with limited energy supply, problems regarding sufficient explosion protection can occur. Problems show themselves as soon as the field device or the radio adapter needs to be connected to a higher voltage source, or when assemblies present in the field device or in the radio adapter produce higher voltages than the energy supply unit. In this case, the voltage supplied part of the field device or radio adapter must have a barrier, which fulfills the following two tasks:

prevention of an electrical current flowing back to the energy supply unit protection against wrong connections.

In the explosion endangered region, supplementally, the following requirements must be fulfilled:

prevent spark formation in the case of disconnection of the energy supply unit sealing-off internal charge storers or voltage sources from the outside.

A known solution for the above-mentioned problem provides a barrier of diodes connected in series. For example, through a series circuit of three diodes, the explosion protection type ex-ia can be implemented. The disadvantage of the known solution is to be seen in the fact that the voltage drop across the diodes leads to a relatively high power loss, which reflects negatively on the lifetime of the energy supply unit, especially the battery. The voltage drop becomes greater with increasing electrical current flowing from the battery.

Another known solution that solve parts of the abovementioned tasks provides electronic circuits, which usually are integrated in a circuit and generally referred to as "ideal diodes". In these circuits, the electrical current flow direction is ascertained and the electrical current, in the case of wrong flow direction, is interrupted by means of a switch, e.g. by means of an FET. The disadvantage of this method is the relatively long reaction time of the circuits: In the case of disconnecting the battery, there is the danger of spark formation, which can have catastrophic consequences in explosion-endangered regions. Through the too-slow reaction of these circuits, charge quantities greater than 40 µJ can also penetrate these barriers, which is not allowable in regions of explosion protected environments.

Based on the earlier described state of the art, an object of the invention is to provide an apparatus which minimizes the voltage drop and therewith the lost power for field devices, which have a limited energy supply available.

The object is achieved by the feature that, between the energy supply unit and an internal voltage source, whose voltage exceeds, or, at times, can exceed, the voltage of the energy supply unit, there is arranged a barrier of at least one diode group having at least two diodes connected in parallel for blocking flow of electrical current from the internal voltage source to the energy supply unit, or to the connection terminals of the field device or of the radio adapter for the energy supply unit. Across the at least two parallel connected and equally constructed diodes, the voltage drop is almost equal, and the electrical current divides itself at least approximately equally to the at least two diodes. In this way, the effect of the voltage increase is reduced in the case of increasing electrical current. In the case of parallel circuits of diodes, in contrast to the known series circuits, there is a marked reduction of the effect of the forward voltage increase under load. Furthermore, according to the invention, it is achieved that only a limited, maximum allowable energy amount gets into the process, upon disconnecting of the battery from the field device or from the adapter. Thus the apparatus of the invention is also applicable in the explosion endangered region.

An advantageous embodiment provides, that a radio module is associated with the field device or the radio adapter and that the field device communicates via the radio module and a radio network with a superordinated control unit. Furthermore, it is provided, in this relationship, that the radio module is integrated in the radio adapter or in a wireless adapter, which is connected with the field device via a first interface provided on the field device and a second interface provided on the radio adapter, together with corresponding connecting lines. Further details for this are presented below.

Alternatively, it is provided that the field device does not have its own energy supply, but instead is fed externally via the radio adapter. In such case, the energy supply unit is integrated in the radio adapter, and the data exchange and the energy supply occur between the energy supply unit and the radio adapter via the same two connecting lines. Further details for this are presented below.

In the case of an autarkic field device or an autarkic radio adapter, the energy supply unit is preferably integrated directly in the field device. Further details for this are presented below.

An especially advantageous embodiment of the field device of the invention, or the radio adapter of the invention, provides that the barrier is composed of three diode pairs connected in series, wherein the diodes of a diode pair are connected in parallel. With this embodiment, the explosion protection type ex-ia can be implemented. This explosion protection type calls for a triple redundance of the diodes, which means that in the case of the failure of two diodes, correct functioning of the circuit is always still assured.

Preferably, the diodes are Schottky diodes. An example of the Schottky diodes are type MBR0520. Schottky diodes have the advantage, compared to other diodes, that the voltage drop is relatively small through them and that they have a relatively fast reaction time.

Advantageously, the diodes in the diode pairs, or the diode groups, are so embodied, that in the case of a disconnection of the energy supply unit from the field device or the radio adapter, a maximum 40 µJ or 40 µVAs reach the connection terminals of the field device, or the connection terminals of the radio adapter, especially the connection terminals of the associated energy supply unit.

preferred as energy supply unit, in connection with the invention, is a disposable battery. Alternatively, a fuel cell, a solar energy supply, or a rechargeable battery can also be used.

As already described above, in connection with the invention, the communication between the field device or the radio adapter and the superordinated control unit can also occur based on one of the communication protocols customary in automation technology.

Figure 2:
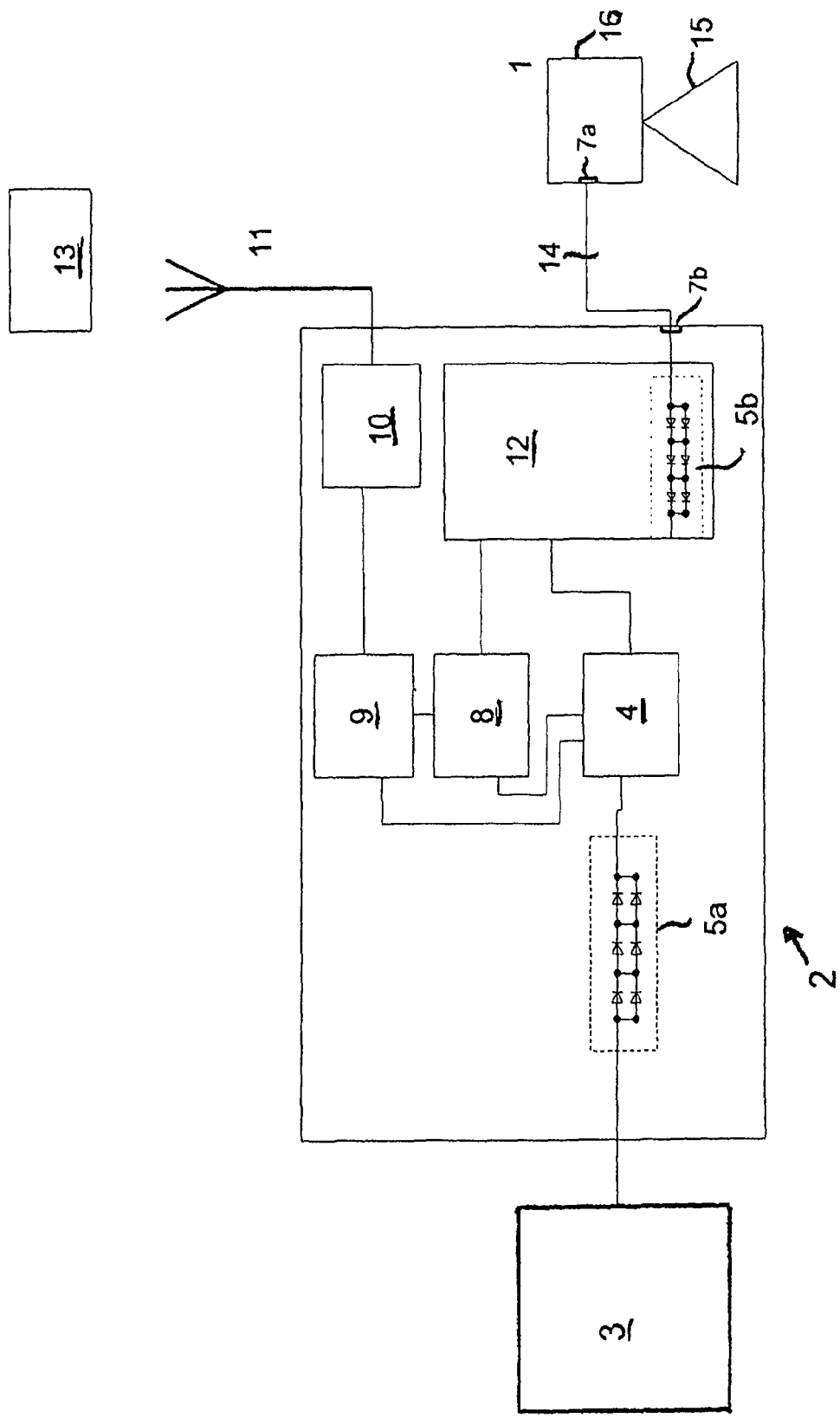

The invention will now be explained in greater detail on the basis of the appended drawing, the figures of which show as follows:

FIG. 1 a schematic representation of a radio network having a plurality of field devices;

FIG. 2 a block diagram of a preferred embodiment of the wireless adapter of the invention;

FIG. 3 a schematic representation of the apparatus of the invention;

FIG. 4 a barrier of three diode groups connected in series, wherein each diode group is composed of n diodes connected in parallel; and FIG. 5 a barrier of three diode groups connected in series, wherein each diode group is composed of two diodes connected in parallel.

FIG. 1 shows a radio network having a plurality of field devices 1, each embodied as a radio field device, and a gateway G. The field devices 1 are connected among one another and with the gateway G, in each case, by radio connections RC, which is indicated in FIG. 1 by the dashed lines. Because the field devices 1 and the gateway G are, in each case, connected via a number of radio connections RC, in the case of a failure of one of the radio connections RC, the communication can be maintained via one of the other radio connections RC.

Frequency Hopping Spread Spectrum (FHSS) or Direct Sequence Spread Spectrum (DSSS) methods, for example, are suitable as radio transmission technologies for the radio connections RC. Due to the required small transmission powers, Ultra Wide Band-technology (UWB) is also very well suited.

The gateway G can also be a long distance transmission unit, e.g. the product "Fieldgate" of the firm, Endress+ Hauser. In this case, the gateway G can communicate worldwide, for example via Internet, GSM or public switched telephone network, with a superordinated unit. Additionally, a (not illustrated) superordinated unit and/or a (not illustrated) servicing device can also communicate directly via a corresponding radio connection with the illustrated radio network.

FIG. 2 presents a schematic representation of a preferred embodiment of the wireless adapter of the invention 2. In the illustrated example, a conventionally embodied field device 1 is connected via a connecting line 14 with the wireless adapter 2. By connection of the wireless adapter 2, the field device 1 becomes a radio field device, and can be, for example, one of the field devices 1 shown in FIG. 1.

The field device 1 is composed of a measured value transducer, or sensor, 15 and a measurement transmitter 16. The field device 1—as already presented at length earlier—can be designed for determining and/or influencing any number of process variables.

Arranged in the radio adapter 2, preferably on a circuit board, are various components. Via an interface 12 and the connecting lines 14, the radio adapter 2 is connected with the measurement transmitter 16. Connected with the interface 12 is an component group 4 for voltage conversion and a communication module 8, or a communication interface 8, as the case may be. In the sense of the invention, the component group for voltage conversion is an internal voltage source 4. The component group 4 for voltage conversion is connected with the communication module 8 and the microprocessor 9.

The field device 1 and the wireless adapter 2 are connected together for communication. In the case of the hardwired communication interface 7a, 7b, such involves, preferably, a HART® communication interface. Associated with the communication interface 7a, 7b is a functional unit, which performs the sending and/or receiving of digital signals (e.g. corresponding to the HART® standard) via the communication interface 7a. Via the communication interface 7a, the field device 1—alternatively to the illustrated connection on the wireless adapter 2—can also be connected to a hardwired fieldbus system, which uses conventional automation technology, e.g. a HART® fieldbus system.

Additionally, the field device 1 includes, likewise not shown, a microprocessor and a data memory, in which, among other things, parameters of the field device 1 are stored. Accessing of the data memory occurs via the microprocessor. For servicing the field device 1 on-site, provided on the field device 1 is usually, likewise not separately shown, a display and service unit, which is in communication connection with the microprocessor.

The wireless adapter 4 includes, as already mentioned, a control unit in the form of a microprocessor 9. For data exchange via the radio network RN, the microprocessor 9 is connected with a radio unit 10, which has a RF-chipset, and an antenna 11. The radio unit 10 is, in such case, embodied in such a manner, that the wireless communication occurs according to a conventional automation technology standard, preferably according to the HART®standard. The microprocessor 9 is additionally connected with, not separately illustrated, a data memory, in which, among other things, parameters of the wireless adapter 2 are stored. For communication with the field device 1, the wireless adapter 2 includes a hardwired communication interface 7b, with which in turn, there is associated a functional unit, which performs the sending and/or receiving of digital signals via the communication interface 7b.

In the case of the arrangement illustrated in FIG. 2, the communication interfaces 7a of the field device 1 and the communication interface 7b of the wireless adapter 2 are connected with one another via a 2-conductor connecting line 14. Via this connection, both the communication between the field device 1 and the wireless adapter 2 occurs, as well as also the electrical current supply of the field device 1 by the wireless adapter 2.

For the purpose of providing the electrical current supply for the field device 1 and the wireless adapter 2, the wireless adapter 2 is associated with an energy supply unit 3. The energy supply unit 3 is able to supply the field device 1, or the radio adapter 2 and the field device 1, with limited energy. The energy supply unit 3 is e.g. a disposable battery, a rechargeable battery, a solar panel, or a fuel cell. In the case of the illustrated field device 1 or the illustrated radio adapter 2, involved, thus, are energy autarkic units.

FIG. 2 presents the case in which the radio module 10 is integrated in a radio adapter 2. Through connection of the radio adapter 2 to the conventional field device 1, the field device 1 can be retrofitted into a radio field device. Of course, the radio module 10 can also be integrated directly into the field device 1.

According to the invention, at least one barrier 5a, 5b is provided, which blocks a flow of electrical current from the internal voltage source 4 back to the energy supply unit 3, or to the connection terminals 7a of the field device 1, or to the connection terminals 7b of the radio adapter 2 for the energy supply unit 3. In the case of the form of embodiment of the apparatus of the invention illustrated in FIG. 2, a barrier 5a is arranged between the component group 4 for voltage conversion and the energy supply unit 3. Another barrier 5b is provided between the interface 12 and the measurement transmitter 16.

The barriers 5a, 5b, in the illustrated case, are composed of three diode groups connected in series and having, in each case, two diodes 6 connected in parallel. By, in each case, the parallel connection of two equal diodes 6, the voltage drop across the diodes 6 is approximately equal, and the applied electrical current on the parallel diodes divides itself at least almost equally. In this way, a smaller power loss can be achieved, which results in an increased lifetime of the battery, or energy supply unit, 3. Through the serial arrangement of three diode pairs, which corresponds to a triple redundancy, the explosion protection type ex-ia can, in turn, be implemented.

The diodes are preferably Schottky diodes. Schottky diodes distinguish themselves by a relatively low voltage drop of 0.2-0.5V per diode at relatively fast switching times.

FIG. 3 is a schematic representation of the autarkic field device of the invention or the autarkic radio adapter of the invention. The component group 4, which is not permitted to have any reaction on the energy supply unit 3, involves, for example, the main circuit board of the radio adapter 2. In order to assure that no electrical current flows from the component group 4 back to the energy supply unit 3, the barrier 5a is provided, which is embodied as shown in FIG. 5. In order that the main board of the radio adapter 2 has no reaction on the measurement transmitter 16, the barrier 5b is connected between them.

The term 'reaction' means, in reference to the use of the field device or the radio adapter in an explosion endangered region, an electrical current, which transports a charge greater than $Q=I \times t=40 \, \mu J$ from the component group 4 to the energy supply unit or from the component group 4 to the measurement transmitter 16.

FIG. 4 presents an alternatively embodied barrier, composed of three diode groups connected in series, wherein each diode group includes n diodes 6 connected in parallel.

List of Reference Characters
1 field device
2 radio adapter, or wireless adapter
3 energy supply unit
4 internal voltage source
5a barrier
5b barrier
6 diode
7a connection terminal
7b connection terminal
8 communication module/communication interface
9 microprocessor 10 radio module
11 antenna
12 interface
13 control unit
14 connecting line
15 measuring transducer/sensor
16 measurement transmitter
G gateway
RN radio network
RC radio connection

The invention claimed is:

1. An autarkic field device, or autarkic radio adapter for a field device, of automation technology fed with limited energy via an energy supply unit associated, or associable, with the field device or the radio adapter comprising:
   connection terminals;
   an internal voltage source; and
   a barrier of at least one diode group having at least two diodes connected in parallel, said barrier being situated between the energy supply unit and said internal voltage source wherein:
   the voltage exceeds, or at times can exceed, the voltage of the energy supply unit;
   said barrier blocks a flow of electrical current from said internal voltage source back to the energy supply unit or to the connection terminals of the field device or of the radio adapter for the energy supply unit;
   said diodes of said diode pairs, or said diode groups, are so embodied that, in the case of a disconnection of the energy supply unit from the field device or from the radio adapter, a maximum 40 µJ, or 40 µVA$_s$, reach said connection terminals of the field device, or said connection terminals of the radio adapter, especially to the connection terminals of the associated energy supply unit.

2. The autarkic field device as claimed in claim 1, further comprising:
   a radio module associated with the field device or the radio adapter wherein:
   the field device communicates via said radio module and a radio network with a superordinated control unit.

3. The autarkic field device as claimed in claim 2, further comprising:
   first and second interfaces; and corresponding connecting lines, wherein:
   said radio module is integrated in the radio adapter, or in a wireless adapter, which is connected with the field device via said first interface provided on the field device and said second interface provided on the radio adapter and said corresponding connecting lines.

4. The autarkic field device as claimed in claim 3, wherein:
   the energy supply unit is integrated in the radio adapter; and
   data exchange and energy supply between the energy supply unit and the radio adapter occur via the same two connecting lines.

5. The autarkic field device as claimed in claim 1, wherein:
   the energy supply unit and the radio module are integrated in the field device.

6. The autarkic field device as claimed in claim 1, wherein:
   said barrier is composed of three diode pairs connected in series; and
   said diodes of a diode pair are connected in parallel.

7. The autarkic field device as claimed in claim 1, wherein:
   said diodes are Schottky diodes.

8. The autarkic field device as claimed in claim 1, wherein:
   communication between the field device or the radio adapter and the superordinated control unit occurs based on a communication protocol customarily used in automation technology.

* * * * *